United States Patent
Lange et al.

(10) Patent No.: US 7,702,180 B2
(45) Date of Patent: Apr. 20, 2010

(54) IMAGING METHOD AND DEVICE FOR THE COMPUTER-ASSISTED EVALUATION OF COMPUTER-TOMOGRAPHIC MEASUREMENTS BY MEANS OF DIRECT ITERATIVE RECONSTRUCTION

(75) Inventors: Axel Lange, Berlin (DE); Manfred Paul Hentschel, Berlin (DE)

(73) Assignee: Bam Bundesanstalt fur Materialforschung und -Prufung, Berlin (DE)

( * ) Notice: Subject to any disclaimer, the term of this patent is extended or adjusted under 35 U.S.C. 154(b) by 972 days.

(21) Appl. No.: 10/545,727

(22) PCT Filed: Feb. 12, 2004

(86) PCT No.: PCT/EP2004/001305

§ 371 (c)(1),
(2), (4) Date: May 2, 2006

(87) PCT Pub. No.: WO2004/072902

PCT Pub. Date: Aug. 26, 2004

(65) Prior Publication Data

US 2006/0233459 A1    Oct. 19, 2006

(30) Foreign Application Priority Data

Feb. 17, 2003   (DE) .................................. 103 07 331

(51) Int. Cl.
*G06K 9/36* (2006.01)
(52) U.S. Cl. ........................ 382/276; 382/130; 382/275; 382/131; 382/128; 382/132; 378/65; 378/8; 600/407; 600/427

(58) Field of Classification Search ................. 382/276
See application file for complete search history.

(56) References Cited

U.S. PATENT DOCUMENTS

| | | | | |
|---|---|---|---|---|
| 5,243,664 A * | 9/1993 | Tuy | ............................. | 382/130 |
| 5,418,827 A * | 5/1995 | Deasy et al. | ................... | 378/65 |
| 5,744,802 A * | 4/1998 | Muehllehner et al. | .. | 250/363.03 |
| 6,385,286 B1 * | 5/2002 | Fitchard et al. | ............... | 378/65 |
| 7,391,027 B2 * | 6/2008 | Kitamura | ............... | 250/363.03 |

(Continued)

FOREIGN PATENT DOCUMENTS

WO      WO 97/05574 A1    2/1997

OTHER PUBLICATIONS

Danielsson, *Linköpings University*, Technical Report No. LiTH-ISY-R-1960, 1-39 (1997).

(Continued)

*Primary Examiner*—Samir A. Ahmed
*Assistant Examiner*—Tsung-Yin Tsai
(74) *Attorney, Agent, or Firm*—Leydig, Voit & Mayer, Ltd.

(57) ABSTRACT

Disclosed are an imaging method and an arrangement for the computer-assisted evaluation of projected object trajectories obtained from a computer-tomographic measurement. According to the inventive method, the trajectories are arranged in a previously known sequence into a projection matrix as traces of the respective voluminous elements, and the following steps are iterated until a sufficient reconstruction quality has been attained; (a) at least one of the traces is selected; (b) a reconstructed element that is true to the original position is formed from each of the selected traces so as to be added to a reconstructed image; (c) the selected traces are removed from the projection matrix.

5 Claims, 3 Drawing Sheets

U.S. PATENT DOCUMENTS

| | | | |
|---|---|---|---|
| 2004/0167387 A1* | 8/2004 | Wollenweber et al. | 600/407 |
| 2004/0260176 A1* | 12/2004 | Wollenweber et al. | 600/427 |
| 2005/0123215 A1* | 6/2005 | Man | 382/275 |
| 2005/0238135 A1* | 10/2005 | Younis et al. | 378/8 |
| 2006/0072800 A1* | 4/2006 | Bernard Deman et al. | 382/131 |
| 2006/0072801 A1* | 4/2006 | Bernard Deman et al. | 382/131 |
| 2007/0297656 A1* | 12/2007 | DeMan et al. | 382/128 |
| 2008/0044076 A1* | 2/2008 | Spies | 382/132 |

OTHER PUBLICATIONS

Danielsson et al., *Nuclear Science Symposium*, 1279-1283 (1997).
Nuyts et al., *Physics In Medicine and Biology*, 43, 729-737 (1998).

* cited by examiner

IMAGING METHOD AND DEVICE FOR THE COMPUTER-ASSISTED EVALUATION OF COMPUTER-TOMOGRAPHIC MEASUREMENTS BY MEANS OF DIRECT ITERATIVE RECONSTRUCTION This application is the U.S. national phase of international patent application PCT/EP04/01305, filed on Feb. 12, 2004, and claims priority to German patent application number 103 07 331.0, filed Feb. 17, 2003, all of which are hereby incorporated by reference.

BACKGROUND OF THE INVENTION

This object preferably is achieved by the characterizing features of the present invention.

Computer tomography is widespread in medical diagnostics and in material sciences. With this and with the methods known until now, computer tomopraphs are imaged from recordings of through-transmission of radiation with X-rays.

However, within the context of the present patent application, the term of a computer-tomographic measurement here includes any interaction of a measured object with an electromagnetic or corpuscular irradiation or with an acoustic wave field.

The projection data resulting from the computer-tomographic measurement is acquired with the measurement from numerous directions, and is processed with the help of a computer-assisted evaluation for imaging structural details.

According to the state of the art at present, an imaging method of "filtered back-projection" is applied for this computer-assisted evaluation. This method based on a Fourier transformation or its computer-optimized implementation demands the preparation of projection data over the full angular range of 180°0 with parallel irradiation and 360° with fan irradiation. For this reason, a complete rotation of the object amid a suitable irradiation and measurement of the interactions over the mentioned angular range is required.

In order to ensure an acceptable picture quality with an adequate local resolution, with low noise and whilst avoiding the formation of artefacts, it is further necessary with the computer-tomographic measurement to apply a high angular resolution over the complete angular range, i.e. to keep the angular distance between adjacent "individual measurements" during a computer-tomographic measurement procedure as low as possible. At the same time these methods process the signal noise basically at the expense of the local resolution.

A grave disadvantage which stems from this last mentioned high sensitivity of the method to noise, as well as from required high angular resolution on measurement, and from the wide angular range which must be acquired, is a high irradiation dose which has a negative effect on the costs of a measurement and in particular also on the health of the patient with medical applications.

BRIEF SUMMARY OF THE INVENTION

It is therefore the object of the present invention to specify an imaging method and a device for computer-assisted evaluation of computer-tomographic measurements, which reconstructs a structurally detailed picture from projected object trajectories, at the same time is robust against signal noise, and reduces the necessary irradiation burdening of the measurement object on measurement, whilst avoiding the disadvantages of the state of the art which have been discussed above.

This object preferably is achieved by an imaging method and arrangement for computer-assisted evaluation according to the present invention.

With this, the imaging method has the following advantages:

By way of the fact that the projected object trajectories, in a sequence resulting from the geometric conditions of measurement, which is therefore already known and mostly sorted according to angles and as tracks of the respective volume elements (voxels) are arranged into a projection matrix, a form of representation in the memory is selected which is particularly suitable for the further processing in the method. Furthermore, this representation in the memory as tracks of the respective volume elements (elements of the examined object, object elements) allows the individual measurement data, whose number is determined by the angular resolution with the computer tomographic measurement procedure, to be supplemented to the complete track, since the characteristics of the course of the track are defined by the geometry of the measurement. One may thus determine the associated course of the track in a simple manner and with a high precision even with a significantly reduced angular resolution, i.e. significantly reduced number of measurement points.

By way of the fact that the following method steps are carried out in an iterative manner, as a whole one achieves a solution which is more efficient with regard to running time than with a recursive solution for example, and which on account of the simplicity of the method steps within the iteration is less of an effort than with a conventional arithmetic reconstruction method.

By way of the fact that in the course of each iteration, firstly at least one track is selected, and then in each case a positionally-true reconstruction element is formed from each of the selected tracks and is added to a reconstruction picture, and the selected tracks concerned are removed from the projection matrix at the end of each iteration, the measured volume elements (object elements) which are represented by measurement data are added to a picture in a stepped manner, wherein the progressive iteration effects a completion of the reconstruction pictures.

Accordingly, a suitable termination condition for the iteration in the method is the attainment of an adequate reconstruction quality.

A further special advantage of this imaging method, the "direct iterative reconstruction" is the fact that on account of the use of tracks of the respective volume elements (object elements) mentioned above, no equidistant angular steps between the individual projections and likewise no complete rotation of the tested object over 180° given parallel irradiation and over 360° given fan irradiation is required. On the contrary, infinite projection angles are possible. By way of this it is particularly advantageously possible to apply a higher angular resolution where a picture reconstruction which is particularly accurate with regard to detail is demanded.

Furthermore, one advantageous effect of the claimed method is the fact that stationary defects of the detectors applied with the computer-tomographic measurement may be ruled out in a particularly simple manner on account on their constant track course (representation as a straight line in the projection matrix). Such defects constantly occur as artefact circles in the methods of the "filtered back-projection", usual according to the state of the art.

One may also correct projection errors in a simple manner on account of the prior knowledge of the characteristic course of the tracks and of the measurement geometry.

Furthermore, the claimed method permits the reconstruction of parts of the measured object, whose projections extend beyond the detector dimensions and therefore partly depart from the detector region. The incomplete tracks in the projection matrix which result from this may just as easily be used as complete tracks. Although this reconstruction is effected with a reduced precision, it however does not lead to artefacts in the imaging region of the completely acquired object regions. This is particularly advantageous when only a part irradiation of a selected object region (region of interest) or an enlarging examination of a selected part volume of the examined object is carried out for a further reduction of the radiation burdening. According to the methods of filtered back-projection known from the state of the art, considerable artefacts arise by way of such types of incomplete projections.

Advantageous embodiments and further developments of the solution will be apparent from the description of the invention provided herein.

If the method is advantageously developed further to the extent that the selection at least of one of the tracks in the course of iteration of the method is effected according to the magnitude of the weight of the respective track, one then succeeds in the part objects of the computer-tomographically measured total object being added successively to the reconstruction picture in the sequence of their weight.

One further advantageous further embodiment envisages the selection of at least one of the tracks according to the magnitude of its contrast with respect to adjacent tracks.

The selection of several tracks per iteration at the same time is advantageously suitable in order to reduce the number of iterations to be run through in the complete reconstruction process. These, as the case may be, are simultaneously removed from the projection matrix.

One advantageous embodiment for fixing the adequate reconstruction quality and thus for use as a termination criteria for the repetition of the iteration is the evaluation of the intensity and/or the fluctuation of the projection matrix. A minimal of reconstruction error is achieved when the remaining intensity of the (residual) projection matrix is zero and the remaining variance of this matrix corresponds to the noise signal of the original starting projection matrix.

In a further advantageous further formation of the method, after the selection of the at least one track, its average value is formed along this. This averaging along the track reduces the noise without compromising the local resolution, whereas the method of filtered back-projection used according to the state of the art encounters an occurring noise by way of averaging in space which has the result of a worsening of the resolution.

"Averaging along a track" within the context of the whole present patent application means an averaging of the tracks of the respective object elements over all observed projection angles. The formation of the average in the complete application range in the present patent application may be particularly advantageously effected from the intensity and/or the contrast of a track.

One advantageous possibility for forming the positionally-true reconstruction element which corresponds to a selected track is to accumulate the average value of the intensity and/or of the contrast of the at least one selected track with a part of its weight.

To contribute to the acceleration of the method and a reduction of the necessary iteration steps, the method is developed further to the extent that in each iteration, the number of tracks to be selected is selected in dependence on the progression of the reconstruction quality of at least one preceding iteration.

By way of this, one may achieve reconstruction pictures providing much information already after a few iteration runthroughs.

The removal of the selected tracks from the projection matrix may be realized in an advantageous manner such that in each case a component of the average value of the respective track is removed from the projection matrix for each of the selected tracks. At the same time it is particularly advantageous to select the component of the average value in dependence on the progression of the reconstruction quality at least of a preceding iteration.

The results of the reconstruction may be even further improved if a selection of certain projected object trajectories is carried out at the beginning or during the course of the method.

BRIEF DESCRIPTION OF THE DRAWINGS

The invention is hereinafter explained in a more specific manner by way of several figures.

There are shown in.

DETAILED DESCRIPTION OF THE INVENTION

Figure 1:
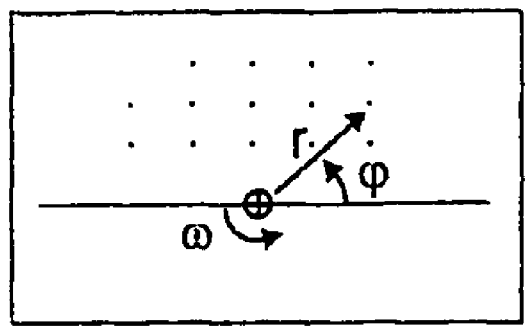
FIG. 1 the representation of a complete object subjected to a computer-tomographic measurement, with rotation point and projection angle ($\omega$, as well as the polar coordinates r and $\phi$ of a volume element, FIG. 2 the associated representation as tracks of the respective object elements in a schematic visualization of the projection matrix, FIG. 3 a reconstruction picture according to a few iteration steps with a rotation point and projection angle, FIG. 4 the projection matrix according to FIG. 2 after the same iteration steps, as well as FIG. 5 an example reconstruction of a model examination object.
Figure 3:
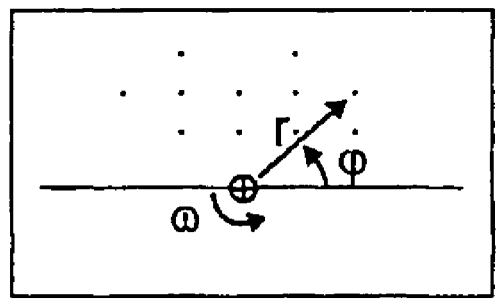

With the method, volume elements (object elements) of a moved examination object are reconstructed into a picture. FIG. 1 by way of example shows a tested object which consists of 14 point-like volume elements of the density one and which has been rotated about the rotation point represented as a reticule along the rotation angle $\omega$. The reconstruction picture arising in the course of the method is shown in FIG. 3 with the procedure of the method not yet completed. Here, 11 of the 14 objects of the examination object are reconstructed.

Figure 2:
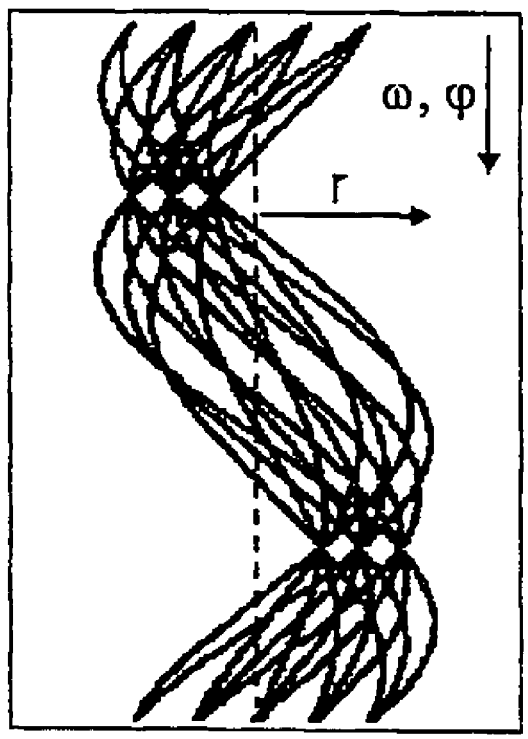

This reconstruction is effected in that firstly the projected object trajectories obtained from a computer-tomographic measurement of the examination object are stored in the sequence of the rotation angle as a track in a projection matrix (sinogram). Such a projection matrix which corresponds to the 14 object points at the beginning of the method is shown in FIG. 2.

Figure 4:
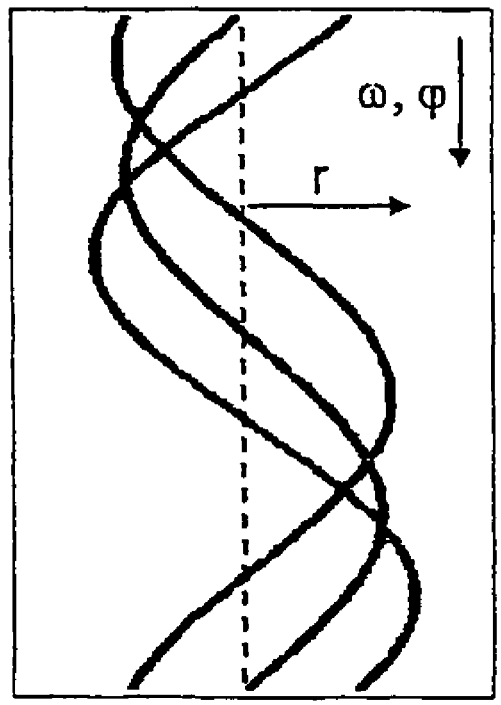

These object trajectories are acquired as a pattern known a priori. The contrast average values of the tracks with the greatest contrast are (here) accumulated successively in a positionally-true manner as weighted points in the reconstruction picture represented in FIG. 3, and are removed from the projection matrix in FIG. 2 as tracks. This last-mentioned process is iterated until reaching an optimal reconstruction picture and up to a remainder of the projection matrix from which the corresponding tracks of the reconstructed objects have been removed, with a sufficiently small weight, as is represented in FIG. 4.

The present imaging reconstruction method which basically permits the reconstruction of the examination object from projections of infinitely selected measurement angles and without explicit filtering is now explained in more detail with the example of parallel-beam projections of a model examination object in one plane.

The model examination object consists of 14 mass points (volume elements; object elements) with the weight 1 in three rows with the polar coordinates and $\phi$, as is shown in FIG. 1. By way of interaction with any irradiation which is incident parallel in the object plane, on measurement, the projections of the mass points is detected as intensity by a detector as so-called linear profiles. In this example, for the purpose of model computation, the computed positions of the mass points (volume elements) are represented for each of the 180 equidistant rotation angles $\omega$ in lines below one another (cf. FIG. 2). This representation of the projected object trajectories in a projection matrix, chiefly a sinogram, contains a description of the individual mass points by way of sinusoidal tracks of the amplitude r and the phase $\phi$.

In the case of measurement data from divergent irradiation, the projections of the mass points in the sinogram are laid down as distorted sine tracks. In this case, the tracks corresponding to the beam geometry are to be used for the reconstruction. This also applies to the three-dimensional reconstruction of object trajectories, such as from three-dimensional computer-tomographic measurement, which are projected onto surface detectors. In the following however, one assumes parallel incident irradiation and sinusoidal tracks for the sake of simplicity of the representation.

For the reconstruction of the measurement data into a picture, firstly an empty, square reconstruction picture with the object rotation point in the center is produced, which for example may be implemented by a suitable matrix. The number of detector elements of the measurement arrangement determines the line and column length of this reconstruction matrix. The polar coordinates of an element of this reconstruction matrix correspond exactly to a sine track in the sinogram, wherein the angle coordinate corresponds to the phase $\phi$, and the radius to the amplitude r.

In each case the measurement values present in the sinogram are summed along all "valid" sine tracks, i.e. over all projection angles, and the weight of each and every "valid" sine track is evaluated. With this, it is those sine tracks which lie symmetrically about the rotation axis and whose amplitudes are smaller than half the length of the reconstruction matrix which are valid. One (or more) of the sine tracks is/are now selected and its average contrast in the reconstruction picture is added at the associated position.

In the present model case of isolated mass points (volume elements), the contrast to the adjacent tracks is selected as a selection criterion by way of carrying out a weight comparison. These in each case are crossed by numerous other tracks, so that the differences to the observed (average) track approximate the true contrast.

In the present case of example, a subtracting sinogram is produced from the current reconstruction matrix. This is subtracted from the sinogram (projection matrix) of the original condition of the beginning of the method. The difference results in a residual sinogram which no longer contains the already reconstructed tracks.

In the now reduced (residual) sinogram, as a projection matrix, the highest contrast track is searched again and its average contrast is deposited in the reconstruction matrix. Again a difference sinogram is produced from the current reconstruction matrix and is subtracted from the original sinogram of the beginning of the method, etc., until a residual sinogram with three sine tracks remains after 11 iterations in this example run-through, as is represented in FIG. 4. In this example, a sine pattern is removed in each iteration step by way of this implementation. Other methods, which in each case in each iteration step remove selected tracks from the projection matrix are likewise conceivable.

According to this example, in this stage of the method run-through, as represented in FIG. 3, 11 mass points of the model examination object are now located in the reconstruction matrix. The model is completely reconstructed into a reconstruction picture after three further iteration steps. In the present case of a point model, the residual sinogram arising from the above-described difference formation will finally be completely empty.

With this, the interpolation of the weights of adjacent elements of the projection matrix on evaluating the average values of a track of the sinogram is important for a precise reconstruction and for the production of subtracting sinograms from the reconstruction matrix.

More complex examination objects may lead to a residual sinogram which may not be reconstructed. This remainder defines a reconstruction error. The contrast of the selected sine tracks may at the same time also be negative so that the reconstruction matrix in the course of the further iteration steps only slightly changes its weight, whereas the local density is changed such that the fluctuation of the residual sinogram becomes smaller. A minimal reconstruction error is achieved when the remaining residual intensity of the residual sinogram is zero and the remaining variance of the residual sinogram corresponds to the noise signal of the sinogram of the method beginning.

Instead of the evaluation and selection of the track with the greatest contrast, the track with the greatest average value, i.e. the greatest weight is also suitable for iterative reconstruction, and the method procedure is the same. This weight criterion is particularly suitable for the reconstruction of flat objects.

A constant is to be expected at each point in time of the iteration process as a sum of the sinogram of the reconstruction matrix and of the residual sinogram, so that the slightest of deviations permits the monitoring of losses of information.

In order to reduce the number of described iteration steps, one may also select several sine tracks and simultaneously remove them from the respective current sinogram.

In the case of more complex examination objects with points and surfaces, the selection of the sine tracks may be applied in a combined manner according to the contrast and weight criterion. Since the registered average values of the selected tracks due to overlapping of other valid tracks generally have a larger average value than corresponding to their volume element (object) in the original, only a part of the average value is to be deposited in the reconstruction matrix. Thus reconstruction errors are kept small at an early stage in the course of the iteration steps.

Extending beyond the represented example, all volume elements (object elements) may have different weights, which e.g. originate from X-ray absorption signals of materials of different density. Basically any local property of mass points of a test object may be reconstructed as long this property is independent of the direction of incident radiation.

The imaging method which is outlined here, the reconstruction method of "direct iterative reconstruction", is suitable for infinite movements of an examination object with respect to the measurement arrangement as soon as the trajectories of its mass points and thus their projections are known. In the case of the rotation without translation components of the object, the projection matrix in which the projected trajectories of the mass points of the object movement are used in their ordered sequence in lines is indicated as a sinogram. Within this context and in the case of the translatory movement, one is to deal with the tracks of the volume elements over the rotation angle as with the sine tracks of the sinogram.

The reconstruction method of the direct, iterative reconstruction processes the noise of the measurement signal for each reconstructed volume element or object element by way of averaging over all projections. Thus a local smearing which unavoidably arises according to the methods of "filtered back-projection" common according to the state of the art is greatly suppressed.

Figure 5:
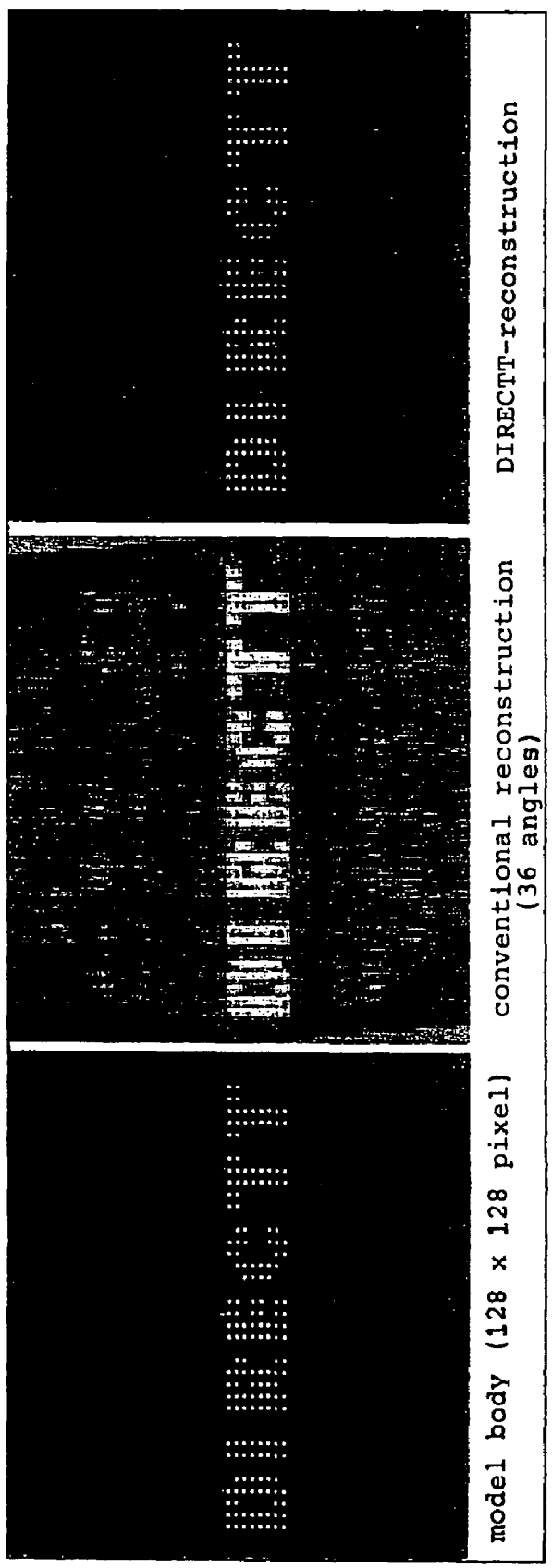

FIG. 5 represents an example reconstruction of a model examination object, which consists of a rastered lettering in a 128×128 pixel matrix and clearly demonstrates the capability of the reconstruction method suggested here.

The raster points of the same weight have a horizontal distance of three units and a vertical distance of two units (FIG. 5, left). 36 parallel beam projections are produced by computation from the model body and are stored as a sinogram (projection matrix). Then the associated reconstruction picture is computed by way of the conventional methods of "filtered back-projection", as the middle representation of FIG. 5 shows.

In this middle representation of FIG. 5 according to the conventional method it may be clearly seen that the vertical point distances are not resolved whilst the horizontal point distances are only resolved in a weak manner. Furthermore one may recognize significant artefacts within the reconstruction circle. The object itself is imaged with a significantly visible smearing of about 3 pixels.

In contrast, the reconstruction according to the method of "direct iterative reconstruction" suggested here is represented in the picture of FIG. 5 on the right. The reconstruction of the computer-tomographic trajectories is positionally-true to 100% (pixel-accurate). The reconstruction picture only has slight deviations from the original in the weighting of the reconstructed raster points. In the present example, the sine tracks were selected according to the described contrast criterion for reconstruction. The reconstruction picture after 75 iteration steps contains 83% of the weight of the original sinogram.

An arrangement for carrying out the suggested method may for example be effected by way of suitable computation means which are realized such that they are optimized to the processing of the above-described method steps. Thus such an arrangement may comprise a memory with a structure for a projection matrix with tracks contained therein, as well as a selector for the selection of certain tracks from the projection matrix, a memory for a reconstruction picture or a reconstruction matrix, a device for positionally-true back-projection of tracks into reconstruction points, a device for removing tracks from the projection matrix and a device for determining the quality of the reconstruction.

The invention claimed is:

1. An imaging method for computer-assisted evaluation of projected object trajectories of volume elements, which are obtained from computer-tomographic measurement, wherein the projected object trajectories are stored in a preknown sequence as tracks of respective volume elements and are arranged into a projection matrix and the following steps are iterated until an adequate reconstruction quality has been achieved, the steps comprising:

storing average values of the tracks representing all elements of the reconstruction matrix into a memory, selecting one or more tracks according to a magnitude of its weight and the magnitude of its contrast with respect to adjacent tracks, forming a positionally-true reconstruction element from the selected one or more tracks including the addition to a reconstruction picture, wherein for forming the positionally-true reconstruction elements of the selected one or more tracks its average value is accumulated with a part of its weight and its contrast, removing the selected one or more tracks from the projection matrix by removing for the selected one or more tracks a portion of the average value of the respective track from the projection matrix, and continuing the iteration on the basis of the thus changed projection matrix.

2. A method according to claim 1, wherein the attainment of an adequate reconstruction quality is effected by determining at least one of the intensity and a fluctuation of the projection matrix.

3. A method according claim 1, wherein after the selection of the one or more tracks, its temporal average value is formed along this track.

4. A method according to claim 1, wherein in each iteration, the number of tracks to be selected is selected in dependence on the progress of the reconstruction quality of a preceeding iteration.

5. A method according to claim 1, wherein the portion of the average value of the respective track is selected from the projection matrix and is selected in dependence on the progress of the reconstruction quality of at least one preceeding iteration.

* * * * *